April 14, 1970   K. E. ERICKSON   3,506,361
OPTICS TESTING INTERFEROMETER
Filed Dec. 13, 1966   2 Sheets-Sheet 1
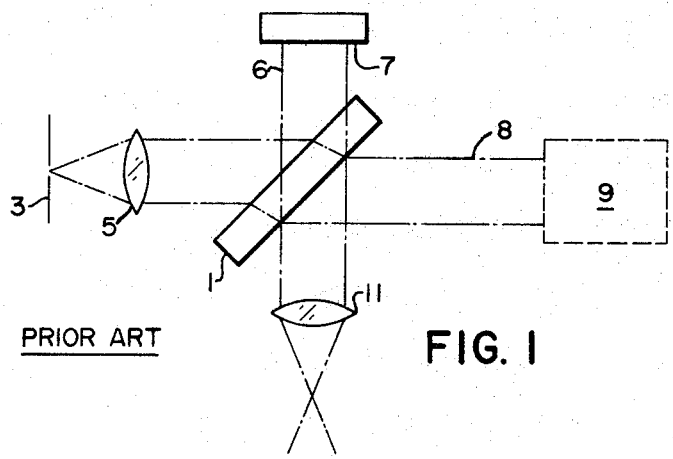
PRIOR ART   FIG. 1
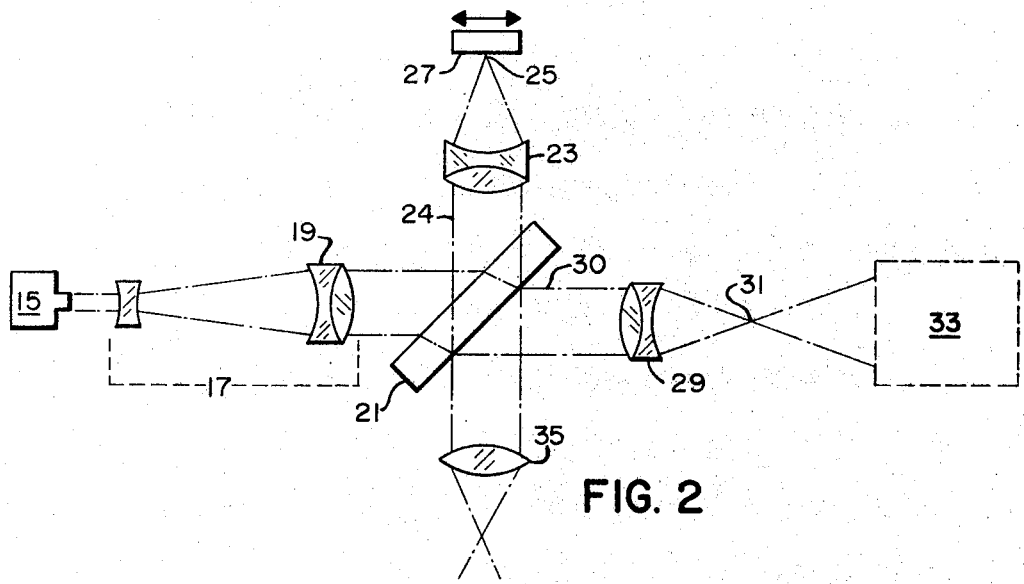
FIG. 2
INVENTOR
KENT E. ERICKSON
BY Lionel N. White
ATTORNEY

United States Patent Office 3,506,361
Patented Apr. 14, 1970

---

3,506,361
OPTICS TESTING INTERFEROMETER
Kent E. Erickson, Ridgewood, N.J., assignor to Keuffel & Esser Company, Hoboken, N.J., a corporation of New Jersey
Filed Dec. 13, 1966, Ser. No. 601,364
Int. Cl. G01b 9/02
U.S. Cl. 356—106                            6 Claims

ABSTRACT OF THE DISCLOSURE

The reference and test beams formed by the beam splitter of an interferometer are separately passed through respective optical elements which image the beams to diffraction limited points. A variable reflectance surface is located at the image point of the reference beam thereby providing means for varying the intensity of the reference beam without distortion of the plane wave front of the reference beam. The testing beam is directed from the image focus point into an optical system under test. An element of the tested system comprises a reflector in order that the test beam double pass the optical system and returns to the image point of the outgoing beam. An eyepiece is provided to view the recombined interfering reference and test beam in order to observe the characteristic fringe patterns normally associated with optical aberrations common to the optical system under test.

BACKGROUND OF THE INVENTION

The present invention pertains to the field of optical testing and more particularly relates to the testing of optical systems by means of interference fringe patterns.

Various types of optical testing devices have previously been employed to determine the perfection in a lens or reflective optical element. In the Foucault Knife Edge Test, for example, a point light source is directed through the optical system under test and is brought to an image focus. A knife edge traversing the beam at the focal point results in the appearance of darkened areas of the image at different intervals if the focus of the system under test is not true, that is, if aberrations exist in the system.

Interferometric testing devices have been found particularly useful in determining the perfection of optical systems or optical elements. The interferometric methods of Burch and Saunders, Concepts of Classical Optics, John Strong (W. H. Freeman & Company, 1958) provide distinctive interference fringe patterns indicative of aberrations in optical systems or elements; however, these methods have limitations which seriously hamper the versatility and ease of testing a wide variety of optical systems.

In the Saunders method, for example, both the reference and test beams go through the optical system under test. As a result, there is no fixed reference of known quality, since one portion of a tested aperture is compared with another portion of the same optical element. Although in the Burch system the reference beam path is limited to the center of the optics under test, thereby providing greater acuracy and more comprehensive quantitative results, the method is severely limited in the scope of its applicability to various optical systems.

The Twyman-Green Interferometric Test System, schematically represented in FIGURE 1 of the drawing, has to date provided a most versatile and widely accepted method of optics testing. Since a fixed reference beam is provided independently of the system under test, a standard plane wave front beam establishes the basis for typical interference fringe patterns which vary according to the aberrations present in the optical system or element under test. As can be seen in FIGURE 1, however, the versatility of the Twyman-Green system is limited in that the beam splitter unit of the interferometer must be at least as large as the system under test in order to provide a test beam which can wholly encompass the tested element.

SUMMARY OF THE INVENTION

In the present optical tester a beam splitter of any convenient size divides a coherent source light beam into reference and test beams in the manner common to known interferometers. In the present configuration, however, the reference beam is image to a diffraction limited point and the point image is focused on the surface of a plane reflector. Various points on the surface of the reflector may be utilized to return the reference beam to recombination with the testing beam without introducing variations in the plane wave form of the returning reference beam. The point image of the reference beam may also be employed in combination with a variable reflectivity surface in the reflector to provide a reference beam of variable intensity. As is well known in interferometry a balance of intensity between the reference and test beams is desirable to obtain optimum clarity of fringe pattern. The intensity of the reference beam may therefore be adjusted as required by the absorptive characteristics of the optics under test.

A focusing lens is similarly inserted in the testing beam of the interferometer configuration and as a result a point focus of the testing beam is obtained. Divergence of the test beam beyond the point of focus may, therefore, be utilized to accommodate an optical system under test which may be of any desired size and need not be limited by the size of the beam splitter in the interferometer.

The test beam is double passed in the optical system under test and returns to the point of focus and thence into recombination with the reference beam to produce a characteristic interference fringe pattern. As with previous interferometric optical testing devices aberrations in an optical system under test will distort the plane wave fronts of the test beam and will form distorted interference fringe patterns at the eyepiece of the interferometer device. A spherical aberration or astigmatism in an optical element can be imediately detected by the characteristic distortion patterns.

The establishment of a point of focus in the test beam may also be utilized to increase the sensitivity of the testing device since a slight displacement of the point of focus from the outgoing image focal point and interposition of a plane reflector at the returning image focal point will result in a quadruple pass through the optics under test with resultant increase in sensitivity.

Any number of imaging optical elements may be tested in the present interferometric system and combinations of optical elements of known perfection with elements of unknown quality may be readily employed to determine the optical perfection of such unknown elements. Because of the noted image focus point and divergence in the testing beam a test device of small and compact size may be utilized to evaluate the optical perfection of systems and elements of exceptionally large size. Optical testing elements utilizing the interferometric method have heretofore been required to approximate the size of the optical system under test.

BRIEF DESCRIPTION OF THE DRAWING

FIGURE 1 is a schematic representation of an interferometric optics tester of the prior art.

FIGURE 2 is a schematic representation of the interferometric optical tester of the present invention.

DESCRIPTION OF THE PREFERRED EMBODIMENT

Figure 3:
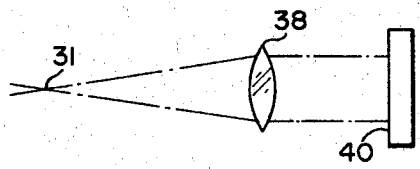
FIGURES 3–7 schematically represent some of the various optical systems and elements capable of test with the device of the present invention.

A preferred embodiment of the present invention is schematically represented in FIGURE 2 of the drawing. A coherent light beam from a source 15 is directed through an enlarging telescope 17 comprising a collimating lens 19 to provide an input beam to the interferometer of the present invention. The beam from a laser source is particularly useful. Within the interferometer there is located a conventional beam splitter 21 which divides the input beam into a reference beam 24 and a testing beam 30. The reference beam is passed through a focusing lens 23 to image the light source at a point 25. A plane surface 27 of variable reflectivity is disposed at the point focus of the reference beam and returns the reference beam through the focusing lens 23 to a point of recombination with the test beam at the beam splitter 21. The reflector 27 is arranged to be movable transversely of the reference beam so that as the reflectivity of surface 27 varies beneath point 25 the intensity of reflected reference beam 24 will likewise vary. The reflector surface 27 may comprise a plane transparent surface with a varying density of reflective silvering across its face.

The testing beam is passed through a focusing lens 29 and brought to a point image 31. From the point image the testing beam diverges and is double passed at the optical system under test, generally represented at 33, and returns through the point focus 31 to the focusing lens 29 and thence to recombination at the beam splitter 21 with the reference beam 24, thereby forming an interference fringe pattern characteristic of the perfection of the system 33. The characteristic fringe pattern is observable through the eyepiece lens 35. The focal length of the lens 29 will, of course, determine the angle of divergence of the test lens from the image point 31 and will be selected with respect to the size of the system 33 under test to provide the desired length of the testing system as a whole.

An interferometric device of the prior art, for example, the Twyman-GGreen interferometer, will be seen in FIGURE 1 to comprise a point source 3, usually of monochromatic light, and a collimating lens 5 to provide the input beam to the interferometer device. A beam splitter 1 divides the input beam into a reference beam 6 and a testing beam 8 of collimated light. The reference beam is reflected directly back to the beam splitter 1 by a plane reflector surface 7 and the testing beam 8 is double passed through a system 9 under test to a point of recombination with the reference beam at the beam splitter 1. It will be noted from FIGURE 1 that a particular limitation of the prior art testing devices resided in the fact that the system 9 under test could not be substantially larger than the beam splitter 1. The recombined beam forms an interference fringe pattern which was observable at the eyepiece 11. The balance of intensity between beams 6 and 8 are entirely dependent upon the absorption in system 9, thereby resulting in unpredictable clarity in fringe patterns.

FIGURES 3 through 7 represent a few of the various optical element configurations which may be tested in the device of the present invention. The point image 31 of the testing beam is indicated in each figure and corresponds with the point 31 in FIGURE 2. Each of the lens elements therefore have been substituted for the general system 33 represented in FIGURE 2.

In FIGURE 3 either lens 38 or optical flat 40 may be the element under test, the other of the depicted elements being of known perfection. The characteristic interference fringe pattern observed at eyepiece 35 in FIGURE 2 will thereby determine the perfection of the lens or optical flat under test.

Figure 4:
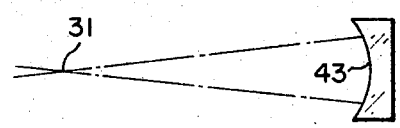
Figure 7:
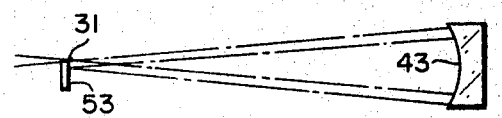

A spherical reflecting surface 43 may be tested as shown in FIGURE 4 by insertion in the path of the testing beam to return the beam to focal point 31 and thence back to the interferometer device. In FIGURE 7 a similar spherical reflective surface 43 may be tested to a more precise degree by canting the reflector 43 to displace the returning point image slightly from the outgoing point image 31 and interposing at the returning point image a plane reflecting surface 53. The testing beam is thereby returned to the reflecting surface 43 and thence to the point image 31 to be returned to the interferometer, thereby increasing the sensitivity of the test system.

Figure 5:
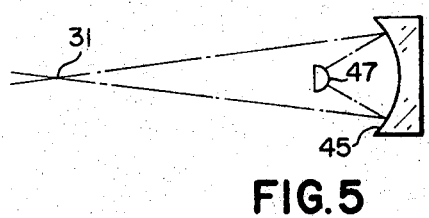
Figure 6:
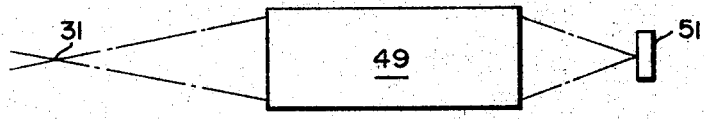

A convex spherical reflective surface 47 or an elliptical reflecting surface 45 may be tested according to the configuration represented in FIGURE 5. Either of the elements 45 and 47 may be of known optical perfection and by characteristic fringe patterns the perfection of the other element may be determined. As shown in FIGURE 6 any system 49 having two real focal points may be tested by inserting a plane reflective element 51 at one of the focal points while locating the other focal point at the point image 31 of the interferometer testing system. The characteristic interference fringe pattern observed at the eyepiece 35 will indicate the optical perfection of the system 49 as a whole.

The embodiments described herein have been presented for the purpose of illustration and should not be taken to limit the scope of the present invention. It will be apparent that the described embodiments are capable of many variations and modifications which are likewise to be included within the scope of the present invention as set forth in the appended claims.

What is claimed is:
1. An interferometric optical testing device comprising:
    (a) means for dividing a coherent light beam to form a reference beam and a test beam;
    (b) means for recombining said reference and test beams after said test beam has been influenced by optics under test, thereby forming characteristic interference patterns;
    (c) means for observing said interference patterns; and
    (d) means disposed in said reference beam for selectively varying the intensity of said reference beam, whereby the intensities of said reference and test beams are rendered substantially equal at said recombining means.
2. An interferometric optical testing device according to claim 1 wherein the means for selectively varying the intensity of said reference beam comprises:
    (a) means disposed to intercept the path of said reference beam and focus said beam at a point; and
    (b) reflective means providing a surface having a plurality of points thereon of regularly varied reflectivity disposed at said point of focus to return said reference beam to said recombining means, said reflective means being selectively movable to present any one of said plurality of points of varied reflectivity on said surface at said point of focus, thereby to return said reference beam to said recombining means at one of a like plurality of light intensities.
3. A device according to claim 2 wherein said reflective means comprises a plane transparent surface having a gradient of reflective silvering across its face, said reflective means being selectively movable in the direction of said gradient.
4. An interferometric optical tester comprising:
    (a) a beam splitter for dividing a coherent light beam to form a reference beam and a test beam;
    (b) means disposed to intercept said reference beam and focus said beam at a point; and
    (c) movable reflective means comprising a surface of varying reflectivity disposed to intercept said ref- erence beam at said point of focus and return said beam through said focusing means to said beam splitter, movement of said reflective means presenting points of varying reflectivity at said point of focus.

5. An optics testing system comprising:
 (a) a source projecting a coherent light beam;
 (b) a beam splitter disposed in said light beam for dividing said beam into a reference beam and a test beam;
 (c) reflective means movable transversely of said beam comprising a surface having a transverse gradient of reflectivity disposed in the path of said reference beam to return said beam along said path to said beam splitter;
 (d) means disposed in the path of said reference beam to focus said beam at a point on said reflective surface, whereby transverse movement of said reflective means will result in a variation in intensity of the returning reference beam;
 (e) optics under test disposed in the path of said test beam;
 (f) means disposed in the path of said test beam to focus said beam at a point intermediate said focusing means and said optics under test;
 (g) means associated with said optic under test disposed in the path of said test beam to return said beam along said path to said point of focus and thence to recombination with said reference beam, whereby interference fringes are formed; and
 (h) means disposed in the recombined beam for observing the pattern of said interference fringes.

6. A method of testing optics which comprises:
 (a) directing a beam of coherent light onto a beam splitter, thereby providing outgoing reference and test beams;
 (b) locating a reflective surface of varying reflectivity in the path of said reference beam so as to cause said beam to be returned back along its outgoing path;
 (c) focusing said reference beam to a point on said reflective surface;
 (d) locating the optics under test in said outgoing test beam path;
 (e) focusing said test beam to a point intermediate said beam splitter and said optics under test, whereby the resulting divergent test beam extends to the desired portion of said optics;
 (f) returning said test beam, after contact with said optics, back along its outgoing path;
 (g) recombining said returning reference and test beams, thereby creating interference fringes;
 (h) moving said reflective surface to a point where the intensity of the returning reference beam is substantially equal to the intensity of the remaining test beam; and
 (i) observing the resulting interference fringe pattern.

References Cited

"The Hilger Microscope Interferometer," F. Twyman, Transactions of the Optical Society, vol. XXIV, No. 4, 1922–23, p. 193.

RONALD L. WIBERT, Primary Examiner

C. CLARK, Assistant Examiner

FO-1050 (5/69)

UNITED STATES PATENT OFFICE
CERTIFICATE OF CORRECTION

Patent No. 3,506,361         Dated   14 April 1970

Inventor(s)   Kent E. Erickson

It is certified that error appears in the above-identified patent and that said Letters Patent are hereby corrected as shown below:

At Column 6, line 22, "remaining" should read --returning--.

SIGNED AND SEALED
AUG 11 1970

(SEAL)
Attest:

Edward M. Fletcher, Jr.
Attesting Officer

WILLIAM E. SCHUYLER, JR.
Commissioner of Patents